US007805813B1

(12) United States Patent
Bunyard (10) Patent No.: US 7,805,813 B1
(45) Date of Patent: Oct. 5, 2010

(54) GRIP FOR USE ON A BAIL (76) Inventor: Robert J. Bunyard, 16726 Scott Way, Grass Valley, CA (US) 95949

( * ) Notice: Subject to any disclaimer, the term of this patent is extended or adjusted under 35 U.S.C. 154(b) by 0 days.

(21) Appl. No.: 10/960,358

(22) Filed: Oct. 6, 2004

Related U.S. Application Data (60) Provisional application No. 60/508,992, filed on Oct. 6, 2003, provisional application No. 60/510,308, filed on Oct. 10, 2003.

(51) Int. Cl.
A47J 45/07 (2006.01)
(52) U.S. Cl. .................. 16/425; 16/110.1; 220/760
(58) Field of Classification Search ........... 16/421, 16/425, 428, 422, 426, 430, 411, 110.1; 220/773–776, 220/765, 755, 759, 760
See application file for complete search history.

(56) References Cited

U.S. PATENT DOCUMENTS

| 96,889 | A | | 11/1869 | Covell | |
|---|---|---|---|---|---|
| 98,291 | A | | 12/1869 | Nashold | |
| 369,549 | A | | 9/1887 | Persch | |
| 614,173 | A | | 11/1898 | Kelly | |
| 645,670 | A | | 3/1900 | Ottignon | |
| 743,945 | A | | 11/1903 | Soden | |
| 918,222 | A | * | 4/1909 | Theurer | 220/814 |
| 1,000,118 | A | | 8/1911 | Pope | |
| 1,226,403 | A | | 5/1917 | Snyder | |
| 1,235,309 | A | | 7/1917 | Garretson | |
| 1,268,775 | A | | 6/1918 | Stanger | |
| 1,501,480 | A | * | 7/1924 | Dye | 16/421 |
| 1,576,546 | A | | 3/1926 | Ransom | |
| 1,618,854 | A | | 2/1927 | Worth | |
| 1,678,005 | A | * | 7/1928 | Hallerman | 294/171 |
| 1,730,820 | A | * | 10/1929 | Holden | 16/431 |
| 2,287,329 | A | | 6/1942 | Santa Maria et al. | |
| 2,294,197 | A | | 8/1942 | Moore et al. | |
| 2,319,147 | A | | 5/1943 | Mason | |
| 2,371,639 | A | | 3/1945 | Mason | |
| 2,398,436 | A | | 4/1946 | Mason | |
| 2,488,309 | A | | 11/1949 | Mason | |
| 2,506,781 | A | | 5/1950 | Elliott | |
| 2,589,423 | A | | 3/1952 | Nadolsky et al. | |
| 2,634,797 | A | | 4/1953 | Wallace | |
| 2,654,115 | A | | 10/1953 | Kafer | |
| 2,684,797 | A | | 7/1954 | Schulte | |
| 2,717,411 | A | | 9/1955 | Taipale | |

(Continued)

FOREIGN PATENT DOCUMENTS

EP 0 085 524 A1 8/1983

(Continued)

Primary Examiner—William L. Miller
(74) Attorney, Agent, or Firm—Dorsey & Whitney LLP (57) ABSTRACT A grip for use with a bail coupled to a container and including an elongate tubular body for extending along a portion of the bail. The body has first and second opposite end portions and a central portion. The central portion can be grasped by a human hand and has a diameter of at least one inch. The first and second end portions have respective first and second engagement surfaces for contacting the bail in spaced-apart positions. The bail extends free of the body between the first and second engagement surfaces.

18 Claims, 3 Drawing Sheets

U.S. PATENT DOCUMENTS

| | | | |
|---|---|---|---|
| 2,743,046 A | 4/1956 | Williams | |
| 2,846,714 A | 8/1958 | Charlick | |
| 3,072,955 A | 1/1963 | Mitchell | |
| 3,083,366 A | 3/1963 | Franges | |
| 3,149,367 A | 9/1964 | Dills | |
| 3,486,684 A | 12/1969 | Dills et al. | |
| 3,635,382 A | 1/1972 | Wilson | |
| 3,800,361 A | 4/1974 | Stauffer | |
| 3,912,140 A | 10/1975 | Franges | |
| 4,071,063 A | 1/1978 | Russell | |
| 4,177,542 A * | 12/1979 | Denney | 16/428 |
| 4,384,602 A | 5/1983 | Ores | |
| 4,590,640 A | 5/1986 | Enersen | |
| 4,656,566 A | 4/1987 | Kelley | |
| 4,724,924 A | 2/1988 | Breyer et al. | |
| 4,791,702 A * | 12/1988 | McVey | 16/428 |
| 4,823,433 A * | 4/1989 | Curtis | 16/411 |
| 4,841,596 A | 6/1989 | Fink | |
| 4,867,722 A * | 9/1989 | Joseph | 441/69 |
| 4,902,060 A | 2/1990 | Nobakht | |
| 4,923,235 A | 5/1990 | Stewart | |
| 4,932,702 A | 6/1990 | Sweeny | |
| 4,936,619 A | 6/1990 | Salazar | |
| 4,955,609 A | 9/1990 | Kassen | |
| 4,982,989 A | 1/1991 | Sweeny | |
| 5,029,926 A | 7/1991 | Dieterich, Jr. | |
| 5,133,472 A | 7/1992 | Koda et al. | |
| 5,411,307 A | 5/1995 | Roberts | |
| D362,181 S | 9/1995 | Meyers et al. | |
| 5,509,708 A | 4/1996 | Nathan | |
| 5,519,908 A | 5/1996 | Steinman et al. | |
| 5,526,954 A | 6/1996 | Georgiadis | |
| 5,622,201 A | 4/1997 | Chang | |
| D383,580 S | 9/1997 | Bolster et al. | |
| 5,738,401 A | 4/1998 | Fan | |
| 5,778,489 A | 7/1998 | Marshal, II | |
| 5,797,166 A | 8/1998 | Wagenheim | |
| 5,806,867 A | 9/1998 | Hampton | |
| 6,234,782 B1 | 5/2001 | Hansen | |
| 6,336,255 B1 | 1/2002 | Gallup | |
| 6,352,169 B2 | 3/2002 | Foster | |
| 6,405,409 B1 * | 6/2002 | Zirella | 16/421 |
| 6,497,006 B2 | 12/2002 | Gallup | |
| 7,039,996 B2 | 5/2006 | Crawley | |
| 2002/0020040 A1 | 2/2002 | Gallup | |
| 2002/0056180 A1 | 5/2002 | Crawley | |

FOREIGN PATENT DOCUMENTS

| | | |
|---|---|---|
| FR | 1235049 A45 | 9/1959 |
| GB | 761947 | 11/1956 |
| GB | 2 113 081 A | 8/1983 |
| GB | 2 135 179 A | 8/1984 |
| GB | 2 147 800 A | 5/1985 |

* cited by examiner

GRIP FOR USE ON A BAIL

CROSS REFERENCE TO RELATED APPLICATIONS

The application claims priority to U.S. provisional patent application Ser. No. 60/508,992 filed Oct. 6, 2003 and to U.S. provisional patent application Ser. No. 60/510,308 filed Oct. 10, 2003, the entire content of each of which is incorporated herein by this reference.

SCOPE OF THE INVENTION

The present invention relates to grips and more particularly to grips for use with bails attached to buckets or similar containers.

BACKGROUND

Currently provided handle grips for buckets are often made from plastic and thin walled. Such grips typically have insufficient diameters to provide a fully dimensioned, contoured cylinder for the hand of the person carrying the bucket to grasp. The weight of a heavy bucket is thus not evenly distributed over the exterior surface of the grip. Instead, as the weight of the bucket increases, the intermediate portion of the bail distorts and pulls down, concentrating the weight of the bucket at the center of the handle and thus on the two middle fingers of the carrier. Control of the rotation of the bucket is hindered because of the concentration of weight at the center of the handle. Any rotation of the bucket at the resulting pivot point also places undesirable strains on the anatomy of the carrier causing injuries to the muscles and tendons involved.

SUMMARY OF THE INVENTION

A grip for use with a bail coupled to a container and including an elongate tubular body for extending along a portion of the bail is provided. The body has first and second opposite end portions and a central portion. The central portion can be grasped by a human hand and has a diameter of at least one inch. The first and second end portions have respective first and second engagement surfaces for contacting the bail in spaced-apart positions. The bail extends free of the body between the first and second engagement surfaces.

BRIEF DESCRIPTION OF THE DRAWINGS

The accompanying drawings, which are somewhat schematic in some instances and are incorporated in and form a part of this specification, illustrate several embodiments of the invention and, together with the description, serve to explain the principles of the invention.

DESCRIPTION OF THE INVENTION

Figure 1:
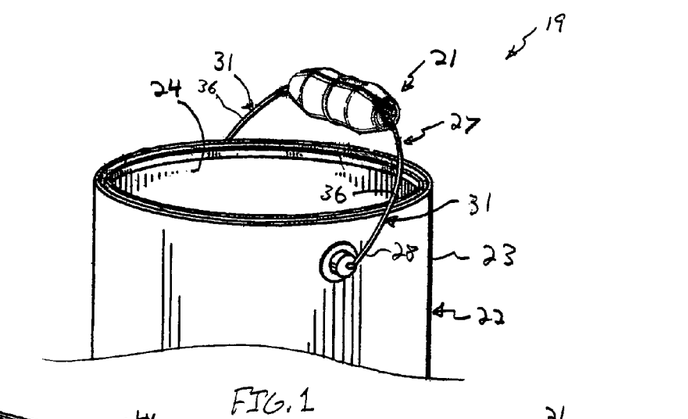
FIG. 1 is a perspective view of a grip of the present invention attached to a bail coupled to a bucket.
Figure 2:
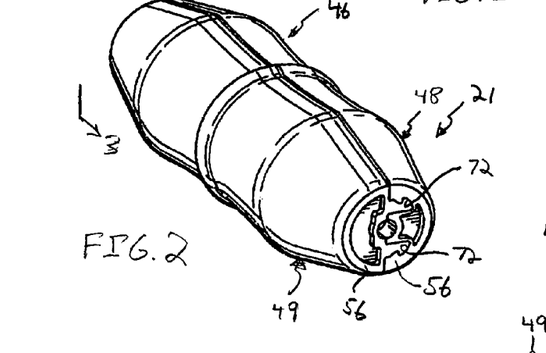
FIG. 2 is an enlarged perspective view of the grip of FIG. 1.

Grip or handle 21 of the present invention can be part of an assembly 19 which includes a container 22, such as a bucket or pail, capable of carrying a heavy material. A particularly suited container 22 is a 3.5 to 6 gallon bucket. A portion of an exemplary container 22 is shown in FIG. 1 and includes a cylindrical sidewall 23 which together with a bottom wall (not shown) provides a cavity 24 for carrying the material. A bail 27 is coupled to container 22. Bail 27 shown in FIGS. 1 and 6 has a generally semi-circular shape and is provided with first and second end portions 28 which are pivotally coupled to opposite sides of sidewall 23 in a conventional manner. The central portion of the bail 27 includes an inset or intermediate portion 29 which is preferably approximately straight, that is straight or having only a slight arch. First and second side portion 31 extend from opposite ends of the inset portion 29 and each includes a complex curved portion 32 having a containment angle 33 and a secondary angle 34. Each of the containment angles 33 bends downwardly towards the respective end portion 28, while the secondary angle bends outwardly to adjoin a sweeping curve 36 which extends to the respective end portion 28. Although grip 21 can be used with bails of other suitable configurations, it is preferable that the bail have an inset portion which is approximately straight and more preferably defined by first and second opposite containment angles such as containment angles 33. The bail can be made of any suitable material such as galvanized metal and has a diameter ranging from 0.134 to 0.154 inch and preferably approximately 0.150 inch. A sleeve-like handle 37, which is preferably tubular in confirmation and made from any suitable materials such as a thin-walled plastic, is disposed on inset portion 29 of the bail 27.

Figure 3:
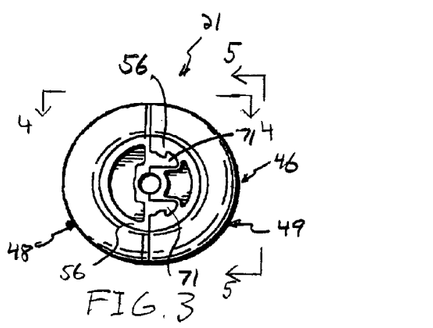
FIG. 3 is an end elevational view of the grip of FIG. 1 taken along the line 3-3 of FIG. 2.
Figure 4:
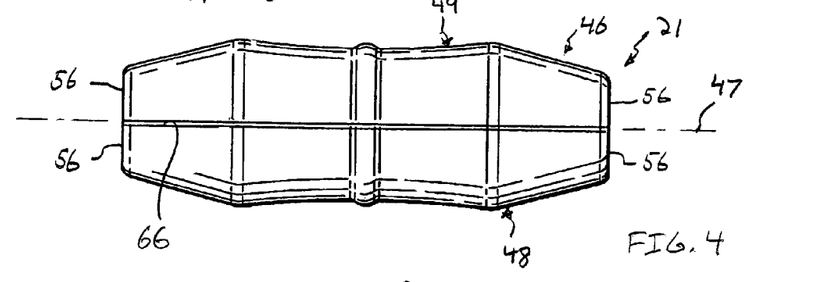
FIG. 4 is a top plan view of the grip of FIG. 1, which is illustrative of the bottom view of the grip of FIG. 1, taken along the line 4-4 of FIG. 3.
Figure 5:
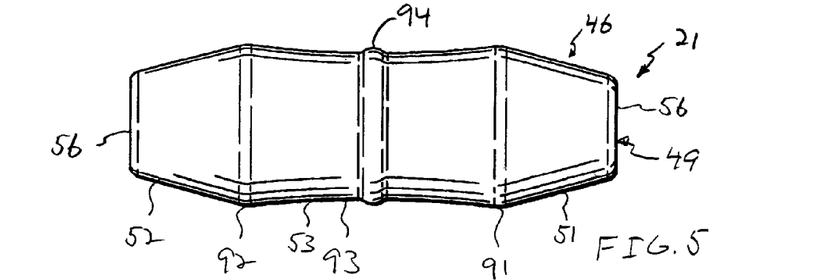
FIG. 5 is a front view of the grip of FIG. 1, which is illustrative of the rear view of the grip of FIG. 1, taken along the line 5-5 of FIG. 3.
Figure 6:
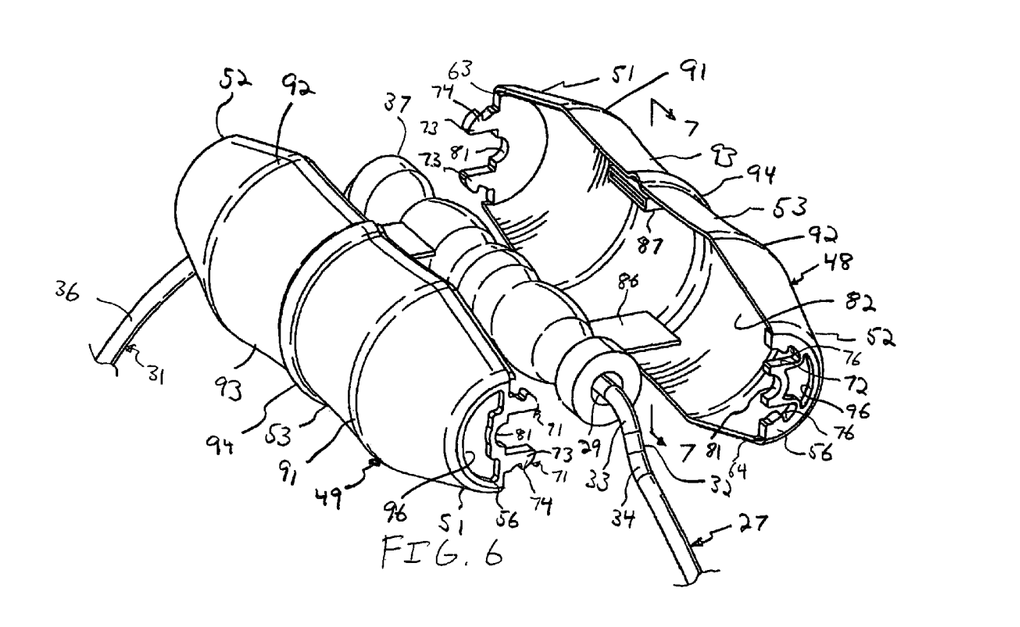
FIG. 6 is an exploded view of the grip of FIG. 1.
Figure 7:
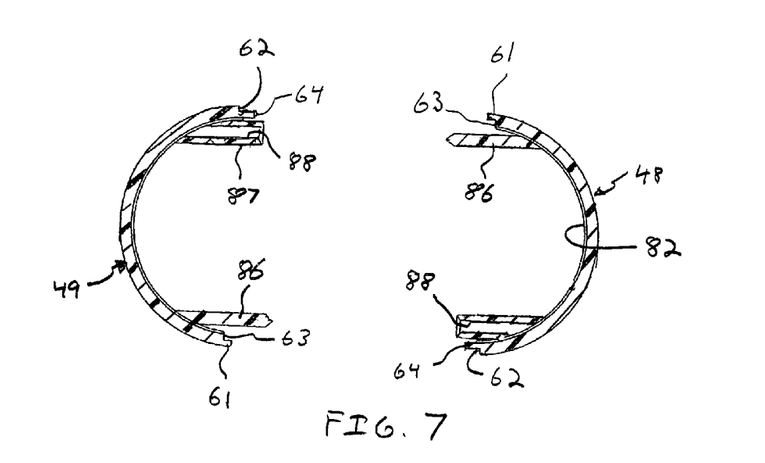
FIG. 7 is a cross-sectional view of the grip of FIG. 1 taken along the line 7-7 of FIG. 6.

Grip 21 has an elongate body 46 which extends along a central longitudinal axis 47, as shown in FIG. 4. Axis 47 approximates the position of inset portion 29 of the bail 27 when body 46 extends around the handle 37 such as shown in FIG. 1. Rigid tubular body 46 is formed from first and second elongate shells 48 and 49 adapted for extending around handle 27 and the inset portion 29 of bail 27 (see FIGS. 2-7). The first and second shells 48 and 49 are preferably identical in conformation and made from any suitable material such as plastic and formed in any suitable procedure such as injection molding. Each of the first and second shells 48 and 49 has first and second opposite ends portions 51 and 52 and a central portion 53 intermediate the end portions 51 and 52. First and second shells 48 and 49 each have a length approximating the length of inset portion 29, for example ranging from 3.75 to 4.25 inches. In one preferred embodiment, the shells 48 and 49 have a length of approximately 3.875 inches. Central portion 53 of each of the shells 48 and 49 has a length ranging from 2.75 to 3.25 inch and preferably approximately 3.00 inch. The central portion 53 of each of the shells 48 and 49 is preferably semi-circular in cross section, as shown in FIGS. 6 and 7. Each of the first and second end portions 51 and 52 is preferably formed with an end wall 56 which is substantially planar and perpendicular to longitudinal axis 47 (see FIGS. 3 and 6). The shells 48 and 49 have a preferable wall thickness of approximately 0.065 inch.

First and second shells 48 and 49 have first and second cooperatively-mating alignment features 61 and 62 for aligning the first and second shells relative to each other during use (see FIGS. 6 and 7). In this regard, each of the shells 48 and 49 is formed with first and second side edges 63 and 64 which preferably extend in an imaginary plane having longitudinal axis 47 therein. The first alignment feature is preferably a lip 61 extending along a portion of, and preferably the entire length of, the first edge 63. The second alignment feature is an elongate recess 62 extending along a portion of, and preferably the entire length of, the second edge 64 (see FIG. 7). The recess 62 on one of the shells 48 and 49 cooperatively receives the lip 61 on the other of the shells 49 and 48 and preferably has an angular depth slightly greater than the angular extension of the respective lip 61 as illustrated in FIG. 7. Such differential in angular dimension of each recess 62 relative to the respective lip 61 provides a longitudinal groove 66 along each side of body 46 where shells 48 and 49 engage (see FIG. 4). The alignment features 61 and 62 of grip 21 additionally serve as strengthening features.

First and second shells 48 and 49 have first and second fastening features 71 and 72 for locking the first and second shells together around handle 37 (see FIGS. 3 and 6). Grip 21 preferably includes a first set of first and second fastening features 71 and 72 at one end of body 46 and a second set of first and second fastening features 71 and 72 at the other end of the body 46. As illustrated in FIG. 6, the fastening features 71 and 72 are more preferably formed in end walls 56 of the shells 48 and 49. Although the first and second fastening features can be of any suitable type, in the illustrated embodiment the first fastening feature is at least one latching member and preferably first and second latching members 71 having the shape of a key 73 and formed from the respective end wall 56. The keys 73 extend outwardly from the imaginary plane of first and second edges 63 and 64 perpendicular of and along opposite sides of longitudinal axis 47. Each of the keys 73 has an outwardly-extending hook or extension 74 at the end thereof. Each of the second fastening features 72 includes at least one recess and preferably first and second recesses 72 for receiving the first and second keys 73 on the corresponding end of the opposed shell. Each recess 72 includes a notch 76 into which the hook or extension 74 of the respective key 73 seats. Each of the first and second shells 48 and 49 has a latching member 71 at its first end portion 51 and a recess 72 at its second end portion 52. Keys and recesses 73 and 72 are cooperatively configured so that the key 73 cannot be removed from the recess 72 once seated therein. This non-removable engagement of latching members 71 and recess 72 serves to lock first and second shells 48 and 49 together once they are pushed against each other around handle 37.

Each of the first and second end portions 51 and 52 of each of the first and second shells 48 and 49 has an engagement surface 81, preferably an arcuate surface, for engaging bail 27 so as to support the bail and thus container 22 when grip 21 is grasped by the hand of the carrier. Each engagement surface 81 is preferably formed in the respective end wall 56 of the end portion 51 or 52 and more preferably between the two latching members 71 or two recesses 72 formed in the end wall (see FIGS. 3 and 6). The arcuate surfaces 81 each preferably have a radius that approximates the radius of bail 27 and more specifically the radius of inset portion 29 of the bail. In this manner, end walls 56 of the first and second end portions 51 and 52 of body 46 snugly engage the bail 27 in spaced-apart positions when first and second shells 48 and 49 are secured around handle 37 and the inset portion 29 extending through the handle. Although arcuate surfaces 81 are shown as being continuous surfaces, it is appreciated that any or all of such surfaces 81 can be segmented, for example have periodic spaces therein, and be within the scope of the invention.

First and second shells 48 and 49 have an internal configuration which permits the handle 37 on bail 27 to extend through body 46 free of the first and second shells 48 and 49 when the shells are locked together around handle 37. In this regard, and as shown in FIG. 6, the internal cavity 82 formed by first and second shells 48 and 49 is configured so that handle 37 and inset portion 29 of the bail 27 extend through body 46 without engaging any portion of the interior of shells 48 and 49. Preferably in this regard, the interior of each of shells 48 and 49 between end walls 56 is free of, that is formed without, any protuberances such as ribs which may engage handle 37 or bail 27.

First and second cooperatively-mating registration features 86 and 87 are carried by first and second shells 48 and 49 for registering the shells 48 and 49 relative to each other during assembly. Such registration features can be in the form of a blade or tab 86 carried by one of shells 48 and 49 and a socket 87 carried by the other of shells 48 and 49. The socket is formed with a recess 88 having a size and shape for snugly receiving at least a portion of the blade 86 when shells 48 and 49 are fastened together. As illustrated in FIGS. 6 and 7, body 46 includes first and second sets of cooperatively mating blades 86 and sockets 87, each disposed at approximately the longitudinal centerline of the body 46. More specifically, a blade 86 extends perpendicularly of the imaginary plane formed by first and second edges 63 and 64 adjacent first edge 63 and a socket 87 having a slot 88 extending perpendicular to such plane is provided adjacent second edge 64 on each of the shells 48 and 49. Registration features 86 and 87 further form an interlock feature and thus serve as strengthening features, particularly circumferential strengthening features, of the grip 21.

When locked together around handle 37 and inset portion 29 of the bail 27, first and second shells 48 and 49 have an ergonomic configuration for facilitating grasping by the hand of the carrier. In this regard, body 46 has a relatively large diameter which closely approximates the diameter of a recess formed by the cupped fingers of an averaged-sized adult. In one preferred embodiment, the central portion 53 of each of first and second shells 48 and 49 forming the body 46 has an outer diameter of at least one inch, preferably ranging from 1.0 to 1.3 inch and preferably a largest diameter of approximately 1.25 inch.

The outer surface of body 46 preferably has a smooth contoured surface for facilitating grasping by a human hand. In this regard, for example, central portion 53 of each of first and second shells 48 and 49 has first and second spaced-apart ridge portions 91 and 92 of a first diameter, for example 1.25 inch. A recessed portion 93 is provided intermediate the first and second ridge portions 91 and 92 and has a second diameter that is less than first diameter. As illustrated most clearly in FIGS. 4 and 5, the outer surface of first and second shells 48 and 49 tapers radially inwardly at a gradual angle, for example three degrees, from each of the ridge portions 91 and 92 to form recessed portion 93. Each of the first and second shells 48 and 49 reduces in diameter from the first and second ridge portions 91 and 92 to the respective first and second end portions 51 and 52. In this regard, and as shown most clearly in FIG. 5, the outer surface of body 46 tapers radially inwardly at a gradual angle, for example 15 degrees, from each of the ridge portions 91 and 92 to the respective end portions 51 and 52. As such, body 46 has an approximately cylindrical conformation formed with tapered ends and a slightly recessed central portion. A radially-thickened strengthening ring 94 is provided around the center of each of first and second shells 48 and 49 for enhancing the circumferential and radial strength of body 46.

The end walls 56 of each of the first and second shells 48 and 49 are provided with recesses 96 therein to reduce the thickness of at least a portion of the end walls 56 and thus facilitate the curing of the injection molded shells 48 and 49 (see FIG. 6).

In operation and use of grip 21, first and second shells 48 and 49 are brought together around handle 37 to form an unitary body 46 which encases or encloses handle 37 and inset portion 29 of the bail 27. As first and second edges 63 and 64 of the first and second shells 48 and 49 approach each other, blades 86 engage respective sockets 87 and latching members 71 engage respective recesses 72 to properly register the first shell 48 relative to the second shell 49. As the shells are further pressed together, the hooks 74 formed on keys 73 snap into the notches 73 in respective recesses 72 so as to lock the first and second shells 48 and 49 together. Shells 48 and 49 flex radially outwardly at first and second end portions 51 and 52 to permit the fully insertion of keys 73 into recesses 72. In this manner, the first and second shells 48 and 49 are non-removably attached together, that is attached in such a manner that separation of the first and second shells would most likely result in destruction of grip 21. Arcuate surfaces 81 of body 46 engage the ends of the inset portion 29 and are restricted from sliding substantially along bail 27 by containment angles 33.

After body 46 has been mounted about handle 37 on the inset portion 29 of bail 27, grip 21 can be grasped by the hand of the carrier to transport container 22 and any material therein. The ergonomic configuration of the grip 21 minimizes fatigue and other damage to tendons, ligaments and muscles throughout the hand, wrist, arm, shoulder and back of the carrier. In this regard, the relatively large diameter of grip 21 and the relatively long length of the grip distribute the weight of container 22 over a relatively large area of the hand and thus minimize stress concentrations on the fingers or other portions of the hand and, as discussed above, other portions of the body. The symmetrical configuration of grip 21 renders the grip ergonomically advantageous at any rotational position about bail 27.

The spaced-apart engagement of inset portion 29 of the bail 27 by arcuate surfaces 81 in the end walls 56 of body 46 at spaced apart positions, which can approximate four inches, facilitates rotation and other handling of container 22 by the carrying person. The two points at which surfaces 81 engage bail 27 serve as the two fulcrum points of grip 21. Further and as discussed above, inset portion 29 of the bail 27 and handle 37 extend between end walls 56 of the first and second shells 48 and 49 free of the shells. Such spacing between handle 37 and the interior of first and second shells 48 and 49 minimizes if not eliminates any engagement of the handle 37 with the interior of body 46 should handle 37 or bail 27 flex during the lifting or transport of container 22. The ability of handle 37 and bail 27 to flex freely inside grip 21 without engaging the interior of body 46 minimizes any prying apart of first and second shells 48 and 49 as a result of such flexing.

The engagement of lips 61 with respective recesses 62 maintains the proper alignment of the first and second shells 48 and 49 during use and enhances the rigidity of body 46. Since grip 21 can rotate about its longitudinal axes when mounted on inset portion 29, there is a possibility that the imaginary plane formed by first and second edges 63 and 64 of the shells 48 and 49 may be disposed in a vertical position during lifting of container 22. The cooperative engagement of lips 61 with recesses 62 restricts relative movement between the first and second shells 48 and 49 when grip 21 is so disposed and thus maintains the rigidity of the grip. The cooperative engagement of lips 61 with recesses 62, together with the contoured configuration of first and second edges 63 and 64, inhibits relative longitudinal movement between the shells 48 and 49 during use. The longitudinal groove 66 provided along the joinder line of shell 48 and 49 on each side of body 46 inhibits undesirable pinching of the skin on the hand grasping the grip 21.

The configuration of the fastening features 71 and 72 of grip 21 maintain first and second shells 48 and 49 in a locked position during use, even when the shells 48 and 49 are aligned in a vertical position such as discussed above. More specifically, the force of bail 27 on arcuate surfaces 81 of the end walls 56 urge the hook 74 of the lower of the two keys 73 on each end wall 56 into the respective notches 76. Fastening features 71 and 72, and namely keys 73, further enhance the strength of grip 21 when disposed in a vertical position by bridging the parting line between the shells 48 and 49.

Recessed portions 93 of the first and second shells 48 and 49 are sized so as to receive the middle two fingers of the hand grasping grip 21 so as to restrict slidable movement of the grip 21 relative to the carrying hand. The thumb and adjoining finger of the hand rest adjacent one ridge portion 91 or 92 and the little finger rest along the opposite ridge portion 91 or 92 of the shells 48 and 49.

The relatively large diameter of body 46 enhances the strength of grip 21 and permits the grip to have a relatively thin-walled design. The strength of grip 21 is further enhanced by the peanut-shaped profile, as shown in FIGS. 4 and 5, provided by first and second ridge portions 91 and 92 and recessed portion 93 therebetween. Circumferentially-extending strengthening ring 94 further contributes to the strength of the grip 21. It is appreciated that grip 21 can be mounted on the inset portion 29 or other portion of a bail 27 having no handle 37 thereon and be within the scope of the invention.

Figure 8:
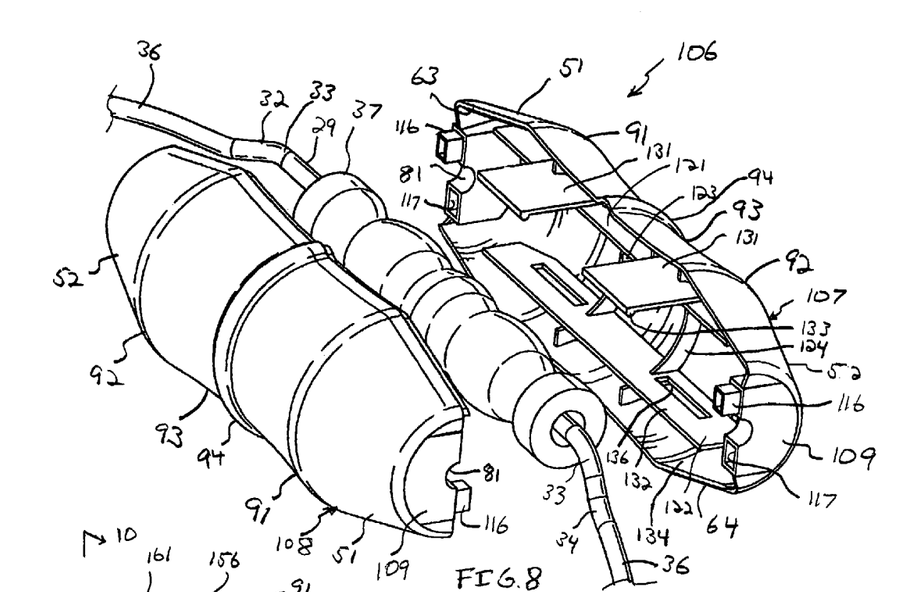
FIG. 8 is an exploded view of another embodiment of the grip of the present invention.

The novel grip disclosed herein can have other configurations and be within the scope of the invention. Grip 106 shown in FIG. 8 is substantially similar to grip 21 and like reference numerals have been used to describe like components of grips 21 and 106. Specifically, the grip 106 has first and second shells 107 and 108 substantially similar to first and second shells 48 and 49 of grip 21. The shells 107 and 108 are dimensioned and shaped similar to first and second shells 48 and 49 and have first and second end portions 51 and 52 and a central portion 53. An end wall 109 aligned similar to end wall 56 of grip 21 is provided at first and second end portions 51 and 52 of each of the shells 107 and 108.

Grip 106 includes registration features 116 and 117 provided on the end walls 109 of each of the first and second shells 107 and 108. In this regard, each wall 109 includes an outwardly extending first registration feature in the form of a post 116 and a second registration feature in the form of a recess 117. The post 116 and recess 117 of each end wall 109 of a shell 107 or 108 are perpendicular to and spaced along opposite sides of longitudinal axis 47 and serve to engage a corresponding recess 117 and post 116, respectively, in the opposing end wall 109 of the other shell 107 or 108.

Each of the first and second shells 107 and 108 is provided with first and second longitudinal, internal ribs 121 and 122 extending between the first and second end portions 51 and 52 of the shell. First rib 121 is adjacent first edge 63 and second rib 122 is adjacent second edge 64 and, as such, ribs 121 and 122 are off center longitudinal axis 47. Each of the shells 107 and 108 further includes first and second internal, circumferential ribs 123 and 124. The first circumferential rib 123 is in the vicinity of first ridge portion 91 and the second circumferential rib 124 is in the vicinity of second ridge portion 92.

First and second shells 107 and 108 have first and second cooperatively-mating registration features 131 and 132 for registering the first and second shells together around handle 37. The first registration feature can be in the form of a blade or tab 131 extending adjacent the first edge 63 and perpendicularly of the imaginary plane formed by first and second edges 63 and 64. The blade 131 is provided with a ridge 133 extending transversely along the free end of the blade and thus parallel to longitudinal axis 47. The second registration feature can be in the form of a socket 132 formed by interior surface 134 of the shell adjacent second edge 64 and second longitudinal rib 122 spaced-apart from such surface 134. The second longitudinal rib 122 is provided with a longitudinally-extending slot 136 therein which receives ridge 133 of the respective blade 131 when first and second shells 107 and 108 are pressed together. In this manner, each ridge 133 and corresponding slot 136 serve as a fastening feature of grip 106. Each of the first and second shells 107 and 108 is preferably formed with two spaced-apart blades 131 and two spaced-apart slots 136, one blade and socket in the vicinity of first ridge portion 91 and the other blade and socket in the vicinity of second ridge portion 92.

In operation, grip 106 can be utilized in substantially the same manner as discussed above with respective to grip 21. When the first and second shells 107 and 108 are brought together around handle 37 and inset portion 29, the two blades 131 on each shell 107 and 108 engage the opposing two sockets 132 on the other shell while the two posts 116 on each shell 107 and 108 seat within the respective two recesses 117 of the other shell. As blades 131 are introduced into sockets 132, the forward or free ends of the blades ride against interior surface 134 until ridges 133 snap into respective slots 136. Thereafter ridges 133 of blades or tabs 131 are retained in slots by the constant contact of the backside of the tabs with interior surface 134. In the same manner as discussed above with respect to grip 21, first and second shells 107 and 108 of grip 106 are non-removably attached together about handle 37.

Arcuate surfaces 81 of first and second shells 107 and 108 engage inset portion 29 of the bail 27 in the same manner as discussed above with respect to grip 21. First and second longitudinal ribs 121 and 122 and first and second circumferential ribs 123 and 124 are appropriately spaced and sized so as to not engage handle 37 when the shells 107 and 108 are pressed together. Accordingly, handle 37 extends free of the interior of first and second shells 107 and 108 between end walls 109 so as to accommodate any flexure of handle 37 and inset portion 29 and also facilitate rotation and transport of container 22 by the carrier.

Figure 9:
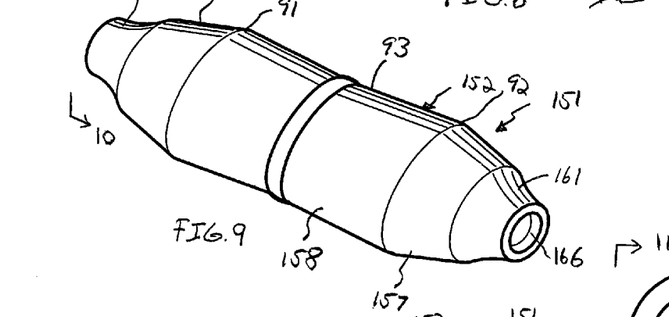
FIG. 9 is a perspective view of a further embodiment of the grip of the present invention.
Figure 10:
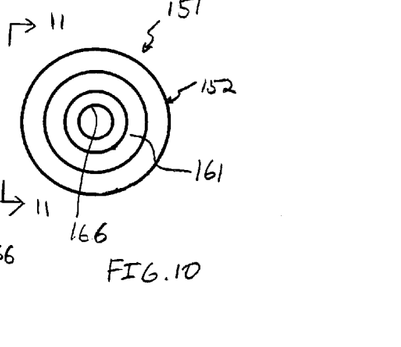
FIG. 10 is an end elevational view of the grip of FIG. 9 taken along the line 10-10 of FIG. 9.
Figure 11:
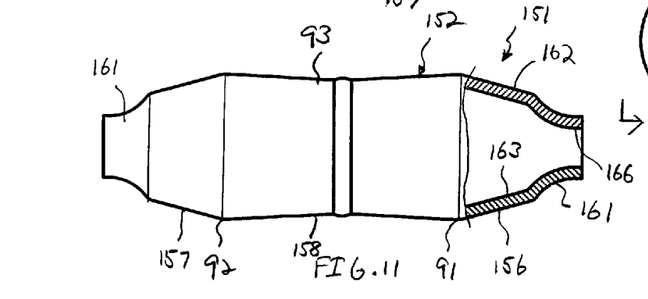
FIG. 11 is a side view of the grip of FIG. 9, which is partially cut away and illustrative of the top, bottom, front and rear views of the grip of FIG. 9, taken along the line 11-11 of FIG. 10.

A further embodiment of the grip of the present invention is illustrated in FIGS. 9-11. Grip 151 shown therein in similar to grip 21 and like reference numerals have been used to describe like components of grips 21 and 151. Lightweight grip 151 is formed from a one-piece tubular body 152 adapted for extending along inset portion 29 of the bail 27. Body 152 is made from any suitable material such as plastic and preferably a resilient and semi-pliable plastic such as polyethylene. The body 152 is formed in any suitable process such as blow molding. Body 152 has first and second end portions 156 and 157 and a central portion 158 intermediate the end portions 156 and 157. First and second end portions 156 and 157 are substantially similar to the first and second end portions 51 and 52 of grip 21, and central portion 158 is substantially similar to central portion 53 of the grip 21. In this regard, for example, body 152 has first and second ridge portions 91 and 92 and a recessed portion between the ridge portions 91 and 92. Unlike first and second end portions 51 and 52, however, first and second end portions 156 and 157 of the blow molded body 152 further include tapered extensions 161 which taper radially inwardly in an arced configuration from the terminus of the 15 degree angled segment of first and second end portions 156 and 157.

Body 152 of the grip 151 can be diametrically sized similar to grip 21 discussed above. Extensions 161 of the first and second end portions of the body 152, however, have a diameter significantly less than the diameter of central portion 158. In this regard, for example, extensions 161 have an outer diameter at their terminus ranging from 0.450 to 0.600 inch and preferable approximately 0.55 inch. Body 152 can be longitudinally sized similar to grip 21, and preferably has a length of approximately 4.25 inches.

Blow molded body 152 has a cross section along its entire length that is circular. In this regard, both outer surface 162 and inner surface 163 of body 152 are substantially circular along the entire length of the body 152. Inner surface 163 is substantially free of protuberances. For example, the interior of body 152 is formed without any ribs or other similar projections extending inwardly therefrom.

Extensions 161 have an engagement surface 166, preferably an arcuate surface and more preferably a circular surface as discussed above, at their terminus for engaging inset portion 29 of the bail 27 in spaced-apart positions. The inner diameter of grip 151 at the terminus of extensions 161 ranges from 0.250 to 0.280 and preferably approximately 0.265. Such diameters provide an orifice at each of the ends of grip 151, which is sufficiently large to permit the insertion of bail 27 by high speed bail-forming machines, yet still providing the grip 151 with a solid rotational control quality.

In operation and use, grip 151 is placed on bail 27 prior to the assembly of container 22 and the bail 27, and more specifically prior to the finished bending of the bail 27. Handle 37 is preferably not included on bail 27 and thus does not extend inside the grip 151. Body 152 has a length approximating the length of inset portion 29 and thus extends between containment angles 33 of the bail 27. The engagement of the necked down extensions 161 of body 152 with containment angles 33 restricts slidable movement of grip 151 on bail 27 and thus serves to retain the grip 151 on inset portion 29 of the bail.

Grip 151 has the same ergonomic features discussed above with respect to grips 21 and 106. Blow molded body 152 of the grip 151 is relatively simple and thus easy to manufacture and inexpensive.

Although the grips of the invention disclosed herein are circular in cross section, it is appreciated that other ergonomic configurations can be provided. For example, a grip having a cross section relative to the longitudinal axis of the grip that is oval or some other arcuate shape that contours to the human hand can be provided. In addition, it is appreciated that a grip that has a more oval profile, that is does not include a recessed portion 93, can be provided. Furthermore, although the grips of the invention are disclosed as having solid-walled shells, it is appreciated that one or more openings in the side walls of the grips, for example in the central portions of the grips, which do not detract from the ergonomic configuration or strength of the grip may be provided.

Although several registration features, fastening features and alignment features have been disclosed for use in the grip of the present invention, it is appreciated that other suitable registration features, fastening features and alignment feature can be provided. Although not shown in the drawings, the exterior surface of the grip of the invention can be textured in any suitable manner or include wording or logos thereon.

As can be seen from the foregoing, a grip for use on a bail coupled to a container has been provided. The grip can be placed over an existing handle on the bail or included as original equipment with the bail and in lieu of a conventional handle. The grip has an ergonomic configuration which inhibits injury to the carrier of the container. The spaced-apart engagement of the grip on the bail facilitates control of the container during transport.

What is claimed is:

1. A grip for use with a bail coupled to a container and having a tubular handle disposed on the bail and for use with a human hand, the grip comprising an elongate tubular body adapted for extending along a portion of the bail, the body having a cylindrical side wall and formed from first and second shells each having first and second opposite end portions, the cylindrical side wall including a central portion adapted for grasping by the human hand and having a diameter of at least one inch for reducing load concentrations on the human hand, the first and second end portions having respective first and second engagement surfaces for contacting the bail in spaced-apart positions and the body having an internal cavity, the first and second engagement surfaces having a transverse dimension and the internal cavity having a transverse dimension greater than the transverse dimension of the first and second engagement surfaces and a length at least as long as the central portion for receiving the tubular handle, the central portion having first and second sets of cooperatively mating registration features for registering the first and second shells relative to each other and enhancing the circumferential rigidity of the cylindrical side wall and the first and second end portions having respective first and second sets of cooperatively mating fastening features, the first and second sets of registration features restricting relative longitudinal movement between the first and second shells so as to cause the first and second fastening features to lock the first and second shells together around the tubular handle whereby the body can be secured to the bail about the tubular handle and facilitate carrying of the container.

2. The grip of claim 1 wherein the central portion has a length of at least 2.75 inches.

3. The grip of claim 1 wherein the first and second engagement surfaces are each arcuate surfaces.

4. The grip of claim 1 wherein the internal cavity is sized and shaped to extend around and free of the tubular handle when the body is secured to the bail.

5. The grip of claim 1 wherein the cylindrical side wall is provided with at least one internal, circumferential rib for enhancing the rigidity of the cylindrical side wall.

6. A grip for use with a bail coupled to a container and having a tubular handle mounted on the bail, the grip comprising first and second elongate shells adapted for extending around the handle on the bail, each of the first and second shells having first and second opposite end walls and a central portion extending between the first and second opposite end walls, the first and second end walls having respective first and second engagement surfaces for contacting the bail in spaced-apart positions and the first and second shells having an internal cavity, the first and second engagement surfaces having a transverse dimension and the internal cavity having a transverse dimension greater than the transverse dimension of the first and second engagement surfaces and a length extending between the first and second end walls for receiving the tubular handle, the central portions of the first and second shells each being semicircular in cross section and having first and second sets of cooperatively-mating registration features for aligning the first and second shells relative to each other around the handle and enhancing the circumferential rigidity of the central portion and restricting relative longitudinal movement between the first and second shells, and the first and second end walls having first and second sets of first and second cooperatively mating fastening features extending in the plane of the respective end wall for locking the first and second shells together around the handle.

7. The grip of claim 6 wherein the first set of first and second fastening features is provided on the first end portions of the first and second shells and the second set of first and second fastening features is provided on the second end portions of the first and second shells.

8. The grip of claim 6 wherein one of the first fastening features is a latching member provided on the first shell and one of the second fastening features is a recess for receiving the latching member.

9. The grip of claim 8 wherein the latching member is formed in the end wall of the first shell and the recess is formed in the end wall of the second shell.

10. The grip of claim 6 wherein the first and second shells are identical.

11. The grip of claim 6 for use by a human hand and with the bail having a radius wherein each of the first and second engagement surfaces has an arcuate surface provided with a radius approximating the radius of the bail for supporting the bail when the first and second shells are grasped by the human hand.

12. The grip of claim 11 wherein the first and second shells have an internal configuration which permits the handle to extend free of the first and second shells when the first and second shells are locked together around the handle.

13. The grip of claim 6 wherein the central portion of each of the first and second shells has a diameter of at least one inch.

14. The grip of claim 6 wherein the central portion of each of the first and second shells has first and second spaced-apart ridge portions of a first diameter and a recessed portion intermediate the first and second ridge portions of a second diameter that is less than the first diameter.

15. The grip of claim 14 wherein each of the first and second shells reduces in diameter from the first and second ridge portions to the respective first and second end portions.

16. The grip of claim 6 wherein each of the first and second shells has an elongate edge extending along the central portion, a lip provided on the edge of the first shell and a recess provided on the edge of the second shell for receiving the lip.

17. An assembly for use by a human hand, the assembly comprising a container, a bail pivotably coupled to the container and having an intermediate portion, a tubular handle disposed on the intermediate portion of the bail, an ergonomic grip of circular cross section extending around the intermediate portion of the bail, the grip being formed from first and second identical shells each having respective first and second opposite end portions and a central portion adapted for grasping by the human hand disposed between the first and second end portions, the first and second end portions of each of the first and second shells having respective first and second engagement surfaces for contacting the intermediate portion of the bail in spaced-apart positions, the first and second shells having an internal cavity between the first and second end portions for receiving the tubular handle, the central portion of the first shell having first and second registration features and the central portion of the second shell having first and second registration features for respectively engaging the first and second registration features of the first shell to enhance the circumferential rigidity of the grip and restrict relative longitudinal movement between the first and second shells, and the first and second end portions of the first shell having first and second fastening features, and the first and second end portions of the second shell having first and second fastening features for respectively engaging the first and second fastening features of the first shell so as to lock the first and second shells together around the intermediate portion of the bail.

18. The assembly of claim 17 wherein the first registration feature is a tab and the second registration feature is a socket.

* * * * *